US011115581B2

(12) United States Patent
Ugawa et al.

(10) Patent No.: US 11,115,581 B2
(45) Date of Patent: Sep. 7, 2021

(54) FOCUS ADJUSTMENT METHOD AND DEVICE USING A DETERMINED RELIABILITY OF A DETECTED PHASE DIFFERENCE

(71) Applicant: Olympus Corporation, Hachioji (JP)

(72) Inventors: Akira Ugawa, Tokyo (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/785,537

(22) Filed: Feb. 7, 2020

(65) Prior Publication Data

US 2020/0296295 A1    Sep. 17, 2020

(30) Foreign Application Priority Data

Mar. 15, 2019    (JP) .............................. JP2019-047987

(51) Int. Cl.
*H04N 5/232*    (2006.01)
*H04N 9/04*    (2006.01)

(52) U.S. Cl.
CPC ..... *H04N 5/232122* (2018.08); *H04N 9/0455* (2018.08)

(58) Field of Classification Search
CPC ........... H04N 5/232122; H04N 9/0455; H04N 5/36961
See application file for complete search history.

(56) References Cited

U.S. PATENT DOCUMENTS

| 2007/0236598 | A1  | 10/2007 | Kusaka    |             |
|--------------|-----|---------|-----------|-------------|
| 2013/0093939 | A1* | 4/2013  | Takanashi | H04N 5/23212 |
|              |     |         |           | 348/345     |
| 2016/0105600 | A1  | 4/2016  | Omata et al. |          |
| 2016/0234428 | A1  | 8/2016  | Okazawa   |             |
| 2016/0295103 | A1* | 10/2016 | Ishii     | H04N 5/23293 |
| 2018/0115729 | A1* | 4/2018  | Ise       | H04N 5/23245 |
| 2019/0045133 | A1* | 2/2019  | Tomosada  | H04N 5/232122 |

FOREIGN PATENT DOCUMENTS

| JP | 2000-101880 A | 4/2000  |
|----|---------------|---------|
| JP | 2014-222268 A | 11/2014 |

* cited by examiner

*Primary Examiner* — Gevell V Selby
(74) *Attorney, Agent, or Firm* — John C. Pokotylo; Pokotylo Patent Services

(57) ABSTRACT

An imaging device, comprising an image sensor having image pixels and phase difference pixels, a phase difference detection section that detects a phase difference based on pixel data of the phase difference pixels, a pixel data calculation section that calculates pixel data of virtual imaging pixels at positions of the phase difference pixels, a degree of coincidence calculation section that calculates a degree of coincidence between each pixel data of the virtual imaging pixels that has been calculated, a reliability determination section that determines reliability of the phase difference detection result in accordance with the degree of coincidence, and a focus adjustment section that performs focus adjustment based on the phase difference detection result and the reliability.

18 Claims, 7 Drawing Sheets

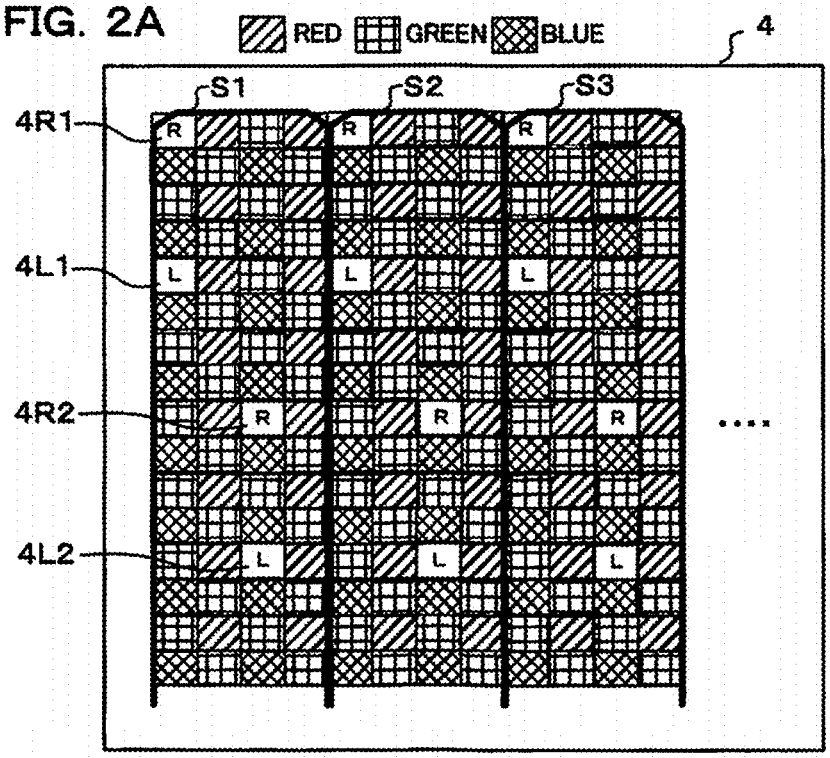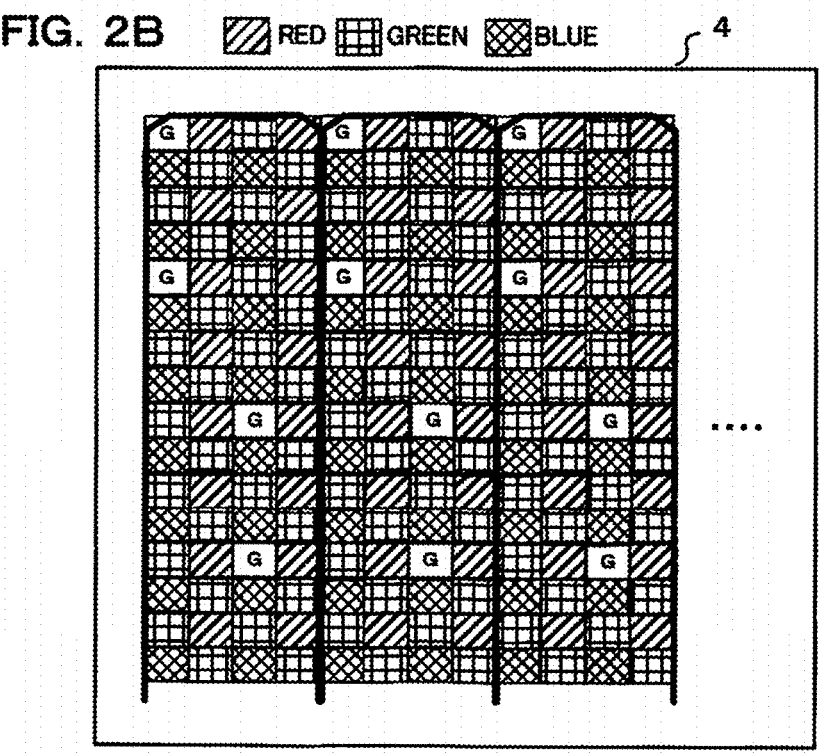

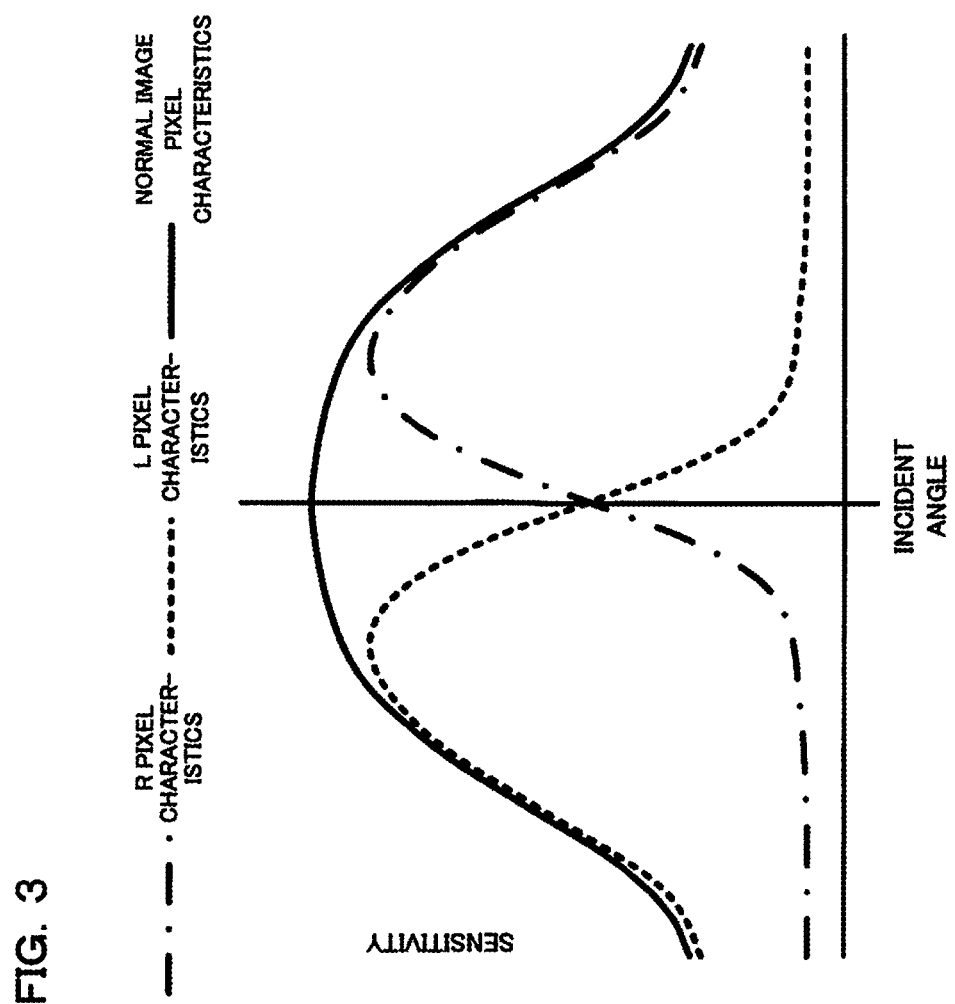

FIG. 4A ▨ RED ▦ GREEN ▩ BLUE
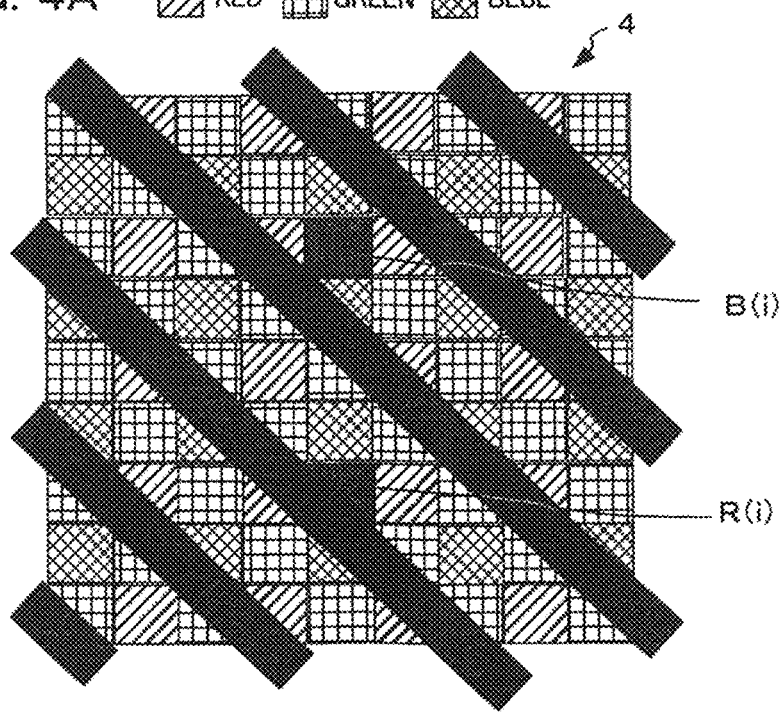
FIG. 4B ▨ RED ▦ GREEN ▩ BLUE
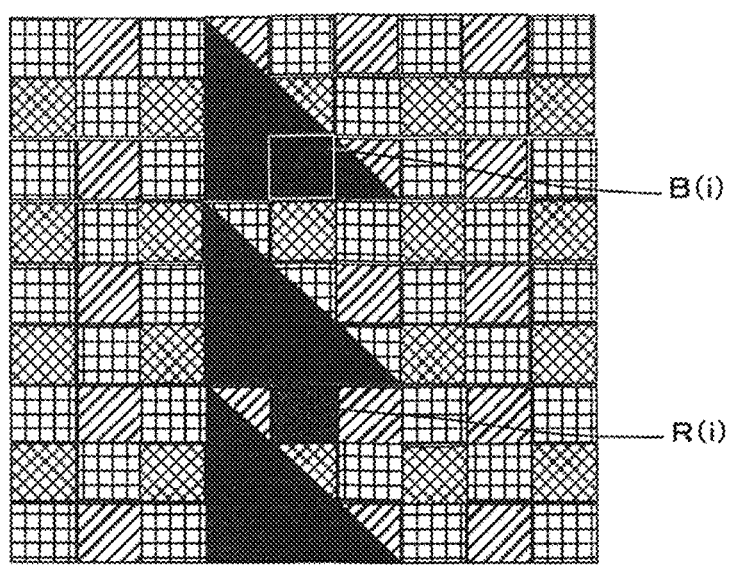

FOCUS ADJUSTMENT METHOD AND DEVICE USING A DETERMINED RELIABILITY OF A DETECTED PHASE DIFFERENCE

CROSS-REFERENCE TO RELATED APPLICATIONS

Benefit is claimed, under 35 U.S.C. § 119, to the filing date of prior Japanese Patent Application No. 2019-047987 filed on Mar. 15, 2019. This application is expressly incorporated herein by reference. The scope of the present invention is not limited to any requirements of the specific embodiments described in the application.

BACKGROUND OF THE INVENTION

1. Field of the Invention

The present invention relates to an imaging device that is provided with an image sensor having phase difference pixels for phase difference detection arranged on an image plane, and to a focus adjustment method of this imaging device.

2. Description of the Related Art

Conventionally, focus adjustment of a photographing lens has been performed using phase difference AF (Auto Focus). With phase difference AF, light flux that has passed through a pair of pupil regions of a photographing lens is subjected to photoelectric conversion by respective photoelectric conversion element rows, phase difference between two photoelectric conversion signals output from the photoelectric conversion element rows is calculated, and focus adjustment of the photographing lens is performed based on this phase difference.

There are various proposals regarding phase difference AF. For example, in Japanese patent laid-open No. 2014-222268 (hereafter referred to as "patent publication 1") it is proposed to arranged phase difference pixels on an image plane of an image sensor, and determine reliability of detections results using image plane phase difference detection. Also, in Japanese patent laid-open No. 2000-101880 (hereafter referred to as "patent publication 2") a structure is disclosed wherein phase difference detection light flux is imaged at a peripheral part of an image sensor by mean of an AF optical system, phase difference is detected based on this phase difference detection light flux, and at the time of shooting the AF optical system is retracted. With this imaging device, pixel data from a peripheral part on an image sensor where phase difference detection light flux is imaged is subjected to interpolation with respect to peripheral pixel data, to generate an image for display. Also, in Japanese patent laid open number 2007-282108 (hereafter referred to as "patent publication 3"), since it is not possible to acquire pixel data for imaging at phase difference pixels positions, it has been proposed, to estimate output of virtual image pixels for phase difference pixel positions, and ensure shooting image quality.

In patent publication 1 described above, determining reliability of image plane phase difference detection is disclosed. However, in a case where a subject is a high frequency pattern, it is likely that reliability will become high for any subject for which false focus is likely. This means that erroneous detection results will be adopted, and focus will be not be achieved. Also, in patent publications 2 and 3 described above it is disclosed that virtual image pixel output for positions of phase difference pixels is estimated in order to ensure image quality of taken images. However, there is no description regarding using output of virtual image pixels for positions of these phase difference pixels in AF. There is also no description whatsoever regarding solving lowering of AF precision for a subject of a high frequency pattern. In particular, in a case where arrangement positions of paired phase difference pixels of the image sensor are separated with respect to a subject of a high-frequency pattern, ranging variations occur, and there is a possibility of erroneous ranging.

SUMMARY OF THE INVENTION

The present invention provides an imaging device and a focus adjustment method of high ranging precision, when performing AF detection, even for a troublesome subject, such as a high-frequency pattern.

An imaging device of a first aspect of the present invention comprises an image sensor having image pixels that receive light of a subject image though a photographing lens and perform photoelectric conversion, and paired phase difference pixels that respectively receive light flux corresponding to pupil regions that are paired with the photographing lens and perform photoelectric conversion on the light flux that has been received, and a processor having a phase difference detection section, pixel data calculation section, degree of coincidence calculation section, reliability determination section, and focus adjustment section, wherein the phase difference detection section detects a phase difference based on pixel data of the paired phase difference pixels, the pixel data calculation section calculates pixel data of virtual image pixels at positions of the phase difference pixels, or selects pixel data of image pixels around positions of the phase difference pixels, the degree of coincidence calculation section calculates degree of coincidence between each pixel data of the virtual image pixels that have been calculated, or calculates degree of coincidence of each pixel data of image pixels that have been selected for positions of paired phase difference pixels, the reliability determination section determines reliability of the phase difference detection result in accordance with the degree of coincidence, and the focus adjustment section performs focus adjustment based on the phase difference detection result and the reliability.

A focus adjustment method of a second aspect of the present invention is a focus adjustment method for an imaging device provided with an image sensor having image pixels that receive light of a subject image though a photographing lens and perform photoelectric conversion, and paired phase difference pixels that respectively receive light flux corresponding to paired pupil regions for the photographing lens and perform photoelectric conversion on the light flux that has been received, the focus adjustment method comprising detecting a phase difference based on pixel data of the paired phase difference pixels, calculating pixel data of virtual image pixels at positions of the phase difference pixels, or selecting pixel data of image pixels around positions of the phase difference pixels, calculating degree of coincidence between each pixel data of the virtual image pixels that have been calculated, or calculating degree of coincidence of each pixel data of image pixels that have been selected for positions of paired phase difference pixels, determining reliability of the phase difference detection result in accordance with the degree of coincidence, and performing focus adjustment based on the phase difference detection result and the reliability.

A non-transitory computer-readable medium of a third aspect of the present invention, storing a processor executable code, which when executed by at least one processor, the processor being provided within an imaging device provided with an image sensor having image pixels that receive light of a subject image though a photographing lens and perform photoelectric conversion, and paired phase difference pixels that respectively receive light flux corresponding to pupil regions that are paired with the photographing lens and perform photoelectric conversion on the light flux that has been received, performs a focus adjusting method, the focus adjusting method comprising detecting a phase difference based on pixel data of the paired phase difference pixels, calculating pixel data of virtual image pixels at positions of the phase difference pixels, or selecting pixel data of image pixels around positions of the phase difference pixels, calculating degree of coincidence between each pixel data of the virtual image pixels that have been calculated, or calculating degree of coincidence of each pixel data of image pixels that have been selected for positions of paired phase difference pixels, determining reliability of the phase difference detection result in accordance with the degree of coincidence, and performing focus adjustment based on the phase difference detection result and the reliability.

BRIEF DESCRIPTION OF THE DRAWINGS

FIG. 2A and FIG. 2B are plan diagrams showing arrangement of pixels of an image sensor of an imaging device of one embodiment of the present invention.

FIG. 3 is a graph showing an R pixel characteristic, L pixel characteristic, and normal pixel characteristic, in the imaging device of one embodiment of the present invention.

FIG. 4A and FIG. 4B are drawings showing examples of high frequency patterns that have been imaged on an image sensor, in the imaging device of one embodiment of the present invention.

DETAILED DESCRIPTION OF THE PREFERRED EMBODIMENTS

An example where the present invention has been applied to a digital camera will be described in the following as an imaging device of one embodiment of the present invention. This digital camera has an imaging section, with a subject image being converted to image data by this imaging section, and the subject image being subjected to live view display on a display section arranged on the rear surface of the camera body based on this image data that has been converted. A photographer determines composition and photo opportunity by looking at the live view display. At the time of a release operation image data is stored in a storage medium. Image data that has been stored in the storage medium can be subjected to playback display on the display section if playback mode is selected.

Figure 5:
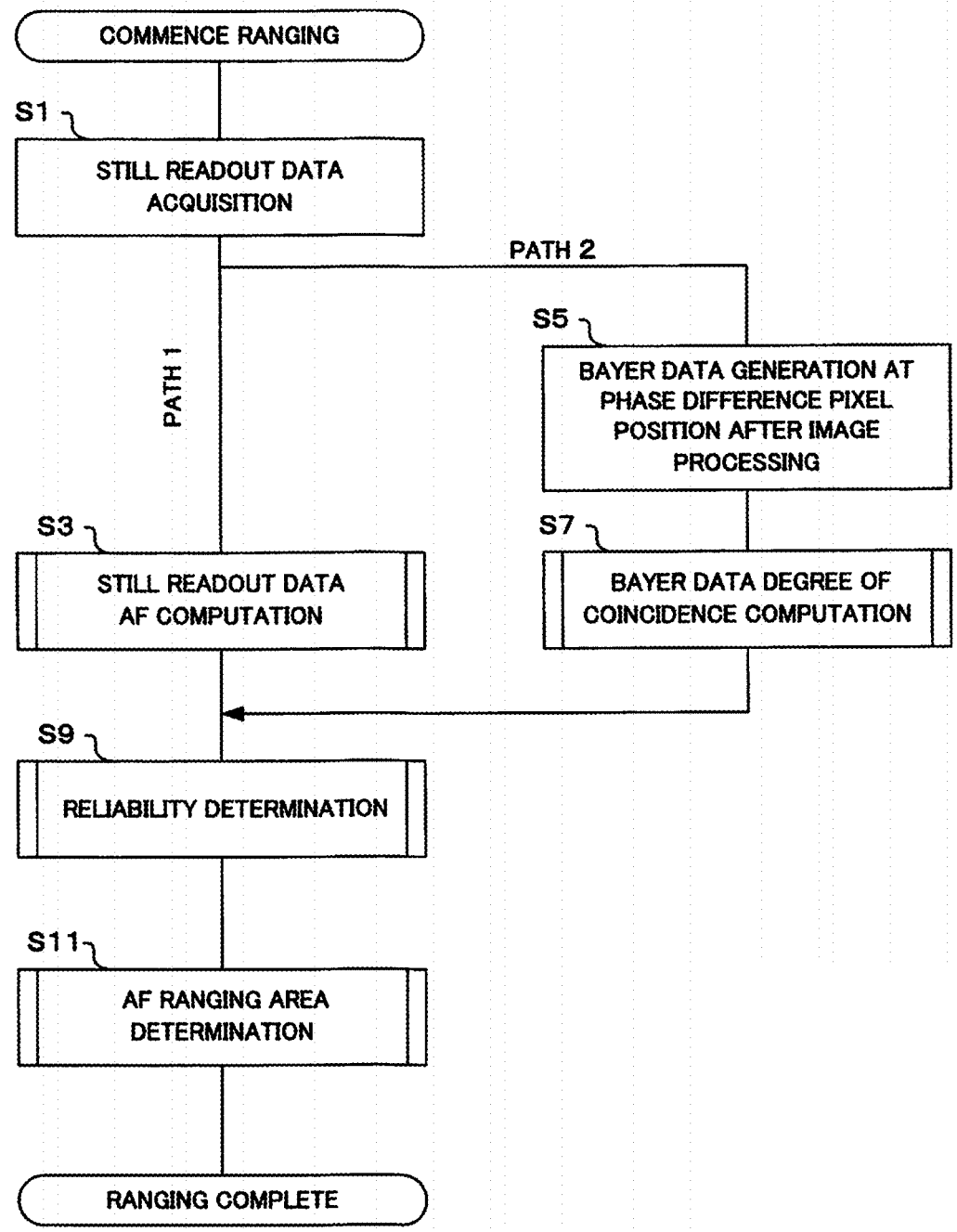
FIG. 5 is a flowchart showing ranging operation, in the imaging device of one embodiment of the present invention.

Also, the imaging device of this embodiment calculates virtual output of normal pixels equivalent to pixel output of image pixels corresponding to positions of pairs of phase difference pixels (refer to S5 in FIG. 5), and obtains degree of coincidence for associated normal pixel virtual output corresponding to positions of pairs of phase difference pixels (refer to S7 in FIG. 5). The imaging device then employs phase difference detection that has used output of those pairs of phase difference pixels in a case where degree of coincidence that has been obtained is high, and phase difference detection is performed by removing output of those pairs of phase difference pixels in a case where degree of coincidence is low (refer to S29 and S31 in FIG. 6).

Figure 1:
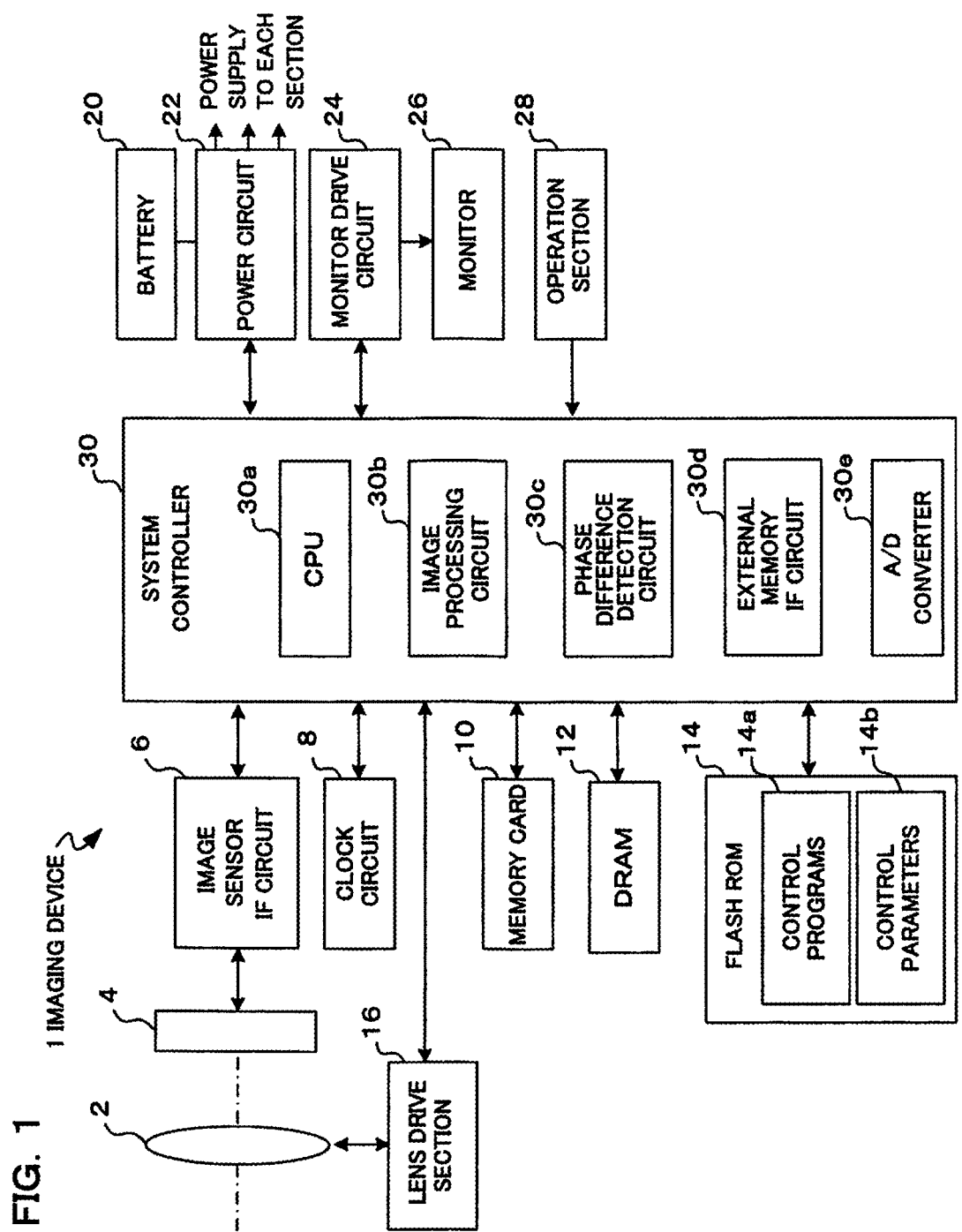
FIG. 1 is a block diagram mainly showing the electrical structure of an imaging device of one embodiment of the present invention.

FIG. 1 is a block diagram mainly showing the electrical structure of an imaging device 1 of this embodiment. The imaging device 1 of this embodiment is a so-called compact camera, and has a lens barrel and a camera body formed integrally. However, this is not limiting, and the imaging device may be an interchangeable lens type camera with which an interchangeable lens can be fitted to and removed from the camera body, such as a single-lens camera.

A photographing lens 2 forms a subject image on an image sensor 4. The photographing lens 2 has a focus lens and a zoom lens etc., and these lenses are capable of movement in an optical axis direction of the photographing lens 2. A lens drive section 16 for moving the focus lens of the photographing lens 2 is arranged. The lens drive section 16 has a lens drive mechanism and lens drive circuit, and the lens drive section 16 moves the focus lens and performs focus adjustment based on control signals from a system controller 30.

Also, an aperture may be arranged on the optical axis of the photographing lens 2, and in this case an aperture drive mechanism and aperture drive circuit for changing the opening diameter of the aperture are arranged. Further, a shutter may be arranged on the optical axis of the photographing lens 2, between the photographing lens 2 and the image sensor 4. In this case, a shutter drive mechanism and a shutter drive circuit are arranged. Exposure control may be performed by adjusting aperture, shutter, sensitivity of the image sensor 4 etc., and may also be performed using any one or two of these three parameters, or by adding an ND filter etc.

The image sensor 4 is arranged close to a position where a subject image is formed by the photographing lens 2. The image sensor 4 is, for example, a CCD (Charge Coupled Device) or CMOS (Complementary Metal-Oxide-Semiconductor) image sensor etc. The image sensor 4 has a pixel section with image pixels and phase difference pixels arranged two-dimensionally. Image pixels are normal pixels, and subject a subject image that has been formed by the photographing lens 2 to photoelectric conversion using photodiodes, and generate a photoelectric conversion signal. An image signal is output based on this photoelectric conversion signal, and subjected to image processing for live view display and for image storage. It should be noted that a contrast value (focus evaluation value) is also calculated using the image signal, and focus adjustment of the photographing lens may be performed using this contrast value and a defocus amount based on the phase difference pixels. It should be noted that the image sensor 4 may have color filters of a Bayer array, as one example.

Also, phase difference pixels respectively subject light flux that has passed through different regions of the photographing lens 2 to photoelectric conversion using photodiodes, and generate a photoelectric conversion signal. Specifically, the phase difference pixels receive only light flux, of the light flux that has passed through the photographing lens, from a specified direction (pupil region) of either of a right direction and a left direction (or upper direction and lower direction etc.), and generate a photoelectric conversion signal. A defocus amount for the photographing lens is calculated by obtaining a phase difference of photoelectric conversion signals based on a pair of light fluxes from one direction and the other direction. Arrangement of phase difference pixels will be described later using FIG. 2A and FIG. 2B, and output of the phase difference pixels will be described later using FIG. 3.

The image sensor 4 functions as an image sensor having image pixels that receive light of a subject image though a photographing lens and perform photoelectric conversion, and paired phase difference pixels that respectively receive light flux corresponding to pupil regions that are paired with the photographing lens and perform photoelectric conversion on the light flux that has been received. As will be described later, the image sensor 4 also has color filters for each pixel.

An image sensor IF (interface) circuit 6 performs photoelectric conversion signal accumulation and readout operations for the image sensor 4. The image sensor IF circuit 6 executes imaging control of the image sensor 4 based on control signals from the system controller 30, and outputs a photoelectric conversion signal that has been readout to the system controller 30. It should be noted that the image sensor IF circuit 6 may also output to the system controller 30 after the photoelectric conversion signal has been subjected to AD conversion.

A clock circuit 8 has a clock function and a calendar function, and outputs clocked results and calendar information to the system controller 30.

A memory card 10 is a storage medium that can be loaded into the body of the imaging device 1, and is an electrically rewritable non-volatile memory. Image data that has been acquired from the image sensor 4 and subjected to image processing for storage is stored in the memory card 10.

DRAM (Dynamic Random Access Memory) 12 is an electrically rewritable volatile memory. Various data used by the system controller 30 is temporarily stored in the DRAM 12. It should be noted that an SDRAM (synchronous dynamic random access memory) may also be provided for temporary storage of image data.

Flash ROM 14 is an electrically rewritable non-volatile memory. Control programs 14a and control parameters 14b are stored in the flash ROM 14. Control programs 14a are used when performing overall control of the imaging device 1 using the CPU 30a. Control parameters 14b are parameters for various circuits and mechanisms, used when performing control of the imaging device 1.

A battery 20 is a power supply battery for performing supply of power to the imaging device 1. A power circuit 22 makes a power supply voltage of the battery 20 into a specified constant voltage, and supplies power to each section within the imaging device 1. A monitor 26 is a monitor that has been arranged on an outer casing of the body of the imaging device, and/or a monitor such as an electronic viewfinder that is viewed by means of an eyepiece. Various images, such as live view images that have been acquired by the image sensor 4, playback images of images that have been stored in the memory card 10, menu images etc. are displayed on the monitor 26. A monitor drive circuit 24 is a circuit for displaying various images that have been output from the system controller 30 on the monitor 26.

An operation section 28 is an input interface for a user to issue various instructions to the imaging device 1. The operation section 28 has various operation members such as a release button, mode dial or switch, touch panel etc., detects operating states and outputs detection results to the system controller 30.

The system controller 30 is a processor that includes a CPU (Central Processing Unit) 30a and peripheral circuits of the CPU. The CPU 30a controls each section within the imaging device 1 in accordance with control programs 14a that have been stored in the flash ROM 14. The system controller 30 or the CPU 30a function as a processor having a phase difference detection section, pixel data calculation section, degree of coincidence calculation section, reliability determination section, and focus adjustment section. It should be noted that in this embodiment, although each of the sections described above are implemented within the system controller 30, the system controller 30 may be a single processor, or may be configured using a plurality of processors.

The previously described reliability determination section determines reliability of phase difference detection in accordance with degree of coincidence. The reliability determination section determines that reliability is low if degree of coincidence is lower than a threshold value. Also, the reliability determination section determines that reliability is higher as degree of coincidence is higher. The reliability determination section determines reliability for every ranging area.

Also, as was described previously, the system controller 30 or the CPU 30a function as a processor having a focus adjustment section that performs focus adjustment based on phase difference detection results and reliability. The focus controller determines a ranging area for calculating defocus amount of the photographing lens by excluding ranging results for ranging areas of low reliability based on the reliability that has been determined for each ranging area (refer to S39 in FIG. 6). The system controller 30 functions as a processor having a pixel data selection section for selecting pixel data of image pixels, around positions of phase difference pixels.

An image processing circuit 30b generates image data from an image signal that has been readout from the image sensor 4, and applies various image processing, such as exposure correction and noise processing, WB gain correction, demosaicing processing, edge enhancement, false color correction etc. to this image data that has been generated or image data that has been saved in DRAM 12. The image processing circuit 30b also performs processing (development processing) to convert image data that has been subjected to the above described image processing to a stored data format.

Also, the image processing circuit 30b calculates virtual image pixel data for positions where phase difference pixels are arranged. Specifically, a mask member (light shielding member) for receiving only light flux passing through the photographing lens 2 from either one of a pair of pupil regions is arranged on the phase difference pixels. Since some of the light flux from the photographing lens 2 is shielded using this mask member, the phase difference pixel data cannot be used as is as image pixel data. The image processing circuit 30b (pixel data calculating circuit) therefore generates virtual image pixel data for phase difference pixel positions using computational processing such as interpolation computation using image pixels that have been arranged around the phase difference pixels. The image processing circuit 30b functions as a pixel data calculation section that calculates pixel data of virtual image pixels at positions of the phase difference pixels, or selects pixel data of image pixels around positions of the phase difference pixels.

The image processing circuit 30b functions as an pixel data calculation section that has a gain setting circuit (gain setting section) that sets gain for pixel data of phase difference pixels, and an interpolation circuit (interpolation section) that interpolates pixel data of virtual image pixels corresponding to positions of phase difference pixels based on pixel data of image pixels positioned around the phase difference pixels, and that calculates pixel data of virtual image pixels corresponding to positions of phase difference pixels, based on values resulting from subjecting pixel data of phase difference pixels to the gain, and pixel data that has been interpolated.

A phase difference detection circuit 30c detects phase difference from output signals of phase difference pixels that have been provided on the image sensor 4, and calculates defocus amount. As was described previously, the phase difference pixels receive only light flux, of the light flux that has passed through the photographing lens, from a specified direction of either of a right direction and a left direction (or upper direction and lower direction etc.), and signals are output based on light flux from one direction and the other direction. The phase difference detection circuit 30c calculates phase difference of two paired signals using these signals. Various computation methods have been proposed for computing phase difference, and phase difference may be obtained by computation such as is disclosed in Japanese patent laid-open No. 2016-015634 and Japanese patent laid-open No. 2016-080791, for example. With this embodiment, a degree of similarity S(i) is obtained using equation (1), which will be described later, and i where this degree of similarity S(i) becomes a minimum value is equivalent to defocus amount. Calculation of phase differences performed for every ranging area.

The phase difference detection circuit 30c functions as a phase difference detection section that detects phase difference based on pixel data of paired phase difference pixels. The phase difference detection section detects phase difference by excluding pixel data of phase difference pixels for which it has been determined that reliability is low. The phase difference detection section detects phase difference for every ranging area.

Also, the phase difference detection circuit 30c performs degree of coincidence computation using equation (1) which will be described later, using virtual image pixel data for phase difference pixel positions that has been calculated by the image processing circuit 30b. This degree of coincidence computation is the same as the phase difference computation, in terms of computation format. The meaning of degree of coincidence computation will be described later, but degree of coincidence computation results are used in determination as to whether or not there is a troublesome subject, when performing phase difference AF detection. The phase difference detection circuit 30c may also be a degree of coincidence circuit, and functions as a degree of coincidence calculation section that calculates degree of coincidence for each pixel data of virtual image pixels that has been calculated for positions of paired phase difference pixels, or calculates degree of coincidence of each pixel data of the image pixels that have been selected for positions of paired phase difference pixels.

The degree of coincidence calculation section calculates degree of coincidence for every ranging area. Also, the phase difference detection circuit 30c functions as a degree of coincidence calculation section that calculates degree of coincidence for associated pixel data of image pixels that have been selected. The degree of coincidence calculation section calculates degree of coincidence based on pixel data of image pixels that have the same color filter. The degree of coincidence calculation section calculates degree of coincidence of associated pixel data of image pixels having color filters of different colors, and the reliability determination section determines reliability based on a plurality of degrees of coincidence corresponding to different colors (refer to FIG. 7 which will be described later). Also, the degree of coincidence calculation section calculates degree of coincidence of associated pixel data of a plurality of image pixels having a color filter of the same color, and the reliability determination section determines reliability based on a plurality of degrees of coincidence for each of a plurality of color filters of the same color (refer to FIG. 7 which will be described later).

An external memory interface (IF) circuit 30d is an interface circuit when writing image data etc. to the memory card 10, and reading image data etc. from the memory card 10. An A/D converter 30e converts various analog signals, such as analog signals that have been output from the image sensor IF circuit 6, to digital data.

Next, arrangement of phase difference pixels and image pixels of the image sensor 4 will be described using FIG. 2A and FIG. 2B. Color filters are arranged for each pixel, in front of the phase difference pixels and image pixels of the image sensor 4. In FIG. 2A, pixels denoted "R" and "L" are phase difference pixels. R pixels are pixels that receive only light flux from a right side direction, of the light flux that has passed through the photographing lens. Also, L pixels are pixels that receive only light flux from a left side direction, of the light flux that has passed through the photographing lens. Pixels that are not denoted "R" or "L" are normal image pixels, and red pixels having a red filter arranged in front, green pixels having a green filter arranged in front, and blue pixels having a blue filter arranged in front, are arranged as shown in FIG. 2A. R pixels and L pixels are arranged at positions of green pixels having a regular color filter arrangement pattern. R pixels and L pixels have green filters arranged in front.

In FIG. 2A, R pixel 4R1 and L pixel 4L1 constitute a pair, and R pixel 4R2 and left pixel 4L2 constitute a pair, and there is a four-pixel separation (interval of three-pixels) between these R pixels and L pixels. Within the vertical direction grid lines S1, S2, S3 . . . addition values of associated R pixels and addition values of associated L pixels are obtained, and computation for phase difference detection is performed using these addition values (refer to equation (1) which will be described later).

FIG. 2B shows appearance of having converted phase difference pixel data of positions of R pixels and L pixels to image pixel data using interpolation. Specifically, phase difference pixel data of R pixels and L pixels has values resulting from having subjected light flux from either one direction within light flux that has passed though the photographing lens to photoelectric conversion, as was described previously. This means that if phase difference pixel data is used as is for a live view image or stored image, there will be degradation in image quality. Values of virtual image pixels for position of the phase difference pixels are therefore obtained by the image processing circuit 30b by interpolation computation, using image pixels around positions of the phase difference pixels. The virtual image pixels (data) are shown as "G" pixels.

As was described previously, phase difference pixels (R pixels, L pixels) are arranged at positions of green pixels. In FIG. 2B, values of "G" pixels are calculated by interpolation computation of values of R pixels or L pixels using imaging pixel data of green pixels respectively surrounding the R pixels or L pixels. Using this interpolation computation it is possible to acquire image pixel data for the whole of the image sensor 4, including positions of phase difference pixels, and it is possible to acquire high quality image data. Also, the phase difference detection circuit 30c performs degree of coincidence computation using virtual image pixel data for positions of G pixels (S7 in FIG. 5). The CPU 30a performs reliability determination based on results of this computation (S9 in FIG. 5).

Next, optical characteristics of the phase difference pixels and image pixels will be described using FIG. 3. The horizontal axis of FIG. 3 shows angle of light flux that is incident on the phase difference pixels and image pixels (normal pixels), and the vertical axis shows exposure sensitivity that has been standardized. As shown in FIG. 3, with the R pixels characteristic exposure sensitivity tends towards a peak of sensitivity at the right side, and with the L pixels characteristic tends towards a peak of sensitivity at the left side. Contrary to this, with the image pixels characteristic a peak of sensitivity is close to an incident angle of 0 degrees, and the sensitivity characteristic is line symmetrical with close to 0° as a center.

In obtaining a phase difference, correlation calculation is performed in ranging computation preprocessing. Specifically, correlation values are calculated using a known method, using pixel addition values for every ranging area, from images corresponding to right openings (standard signal) and left openings (reference signal). In order to cut down on computation amount, the correlation calculation uses a method of scanning a reference signal with a standard signal, and computing a degree of similarity for each position on the reference signal, for example, detecting position where a correlation computational value becomes minimum and degree of similarity is maximum. By making one standard signal B(i) and making the other reference signal R(i), degree of similarity S(i) can be calculated from equation (1) below. $\alpha$ represents correlation calculation range. It can be considered that a scanning position where degree of similarity S(i) becomes a minimum value is where correlation between the standard signal and the reference signal will be highest. Correlation calculation is performed for every ranging area.

$$S(i) = \sum_{K=-\alpha/2}^{\alpha/2} |B(i+K) - R(K)| \quad (1)$$

In equation (1) above, the closer value for degree of similarity S(i) is to 0, the less the difference between standard signal B(i) and reference signal R(i), which means that there is no difference between images within the ranging area. On the other hand, since normal image pixels are all open, an incident characteristic becomes line symmetrical about the origin (0°), as shown in FIG. 3. This means that if correlation calculation of equation (1) is performed using a pair of associated image pixel data, it will result in a fixed value regardless of the angle of incidence. Accordingly, a case where correlation calculation using image pixel data is performed and there is a change in this computation value means there is difference in image data, not in defocus amount.

As was described using FIG. 2A, generally a pair of phase difference pixels (R pixels L pixels) are arranged with distance between them. If the R pixels and L pixels are close, then it will become difficult to calculate pixel data for normal image pixels corresponding to positions of phase difference pixels by interpolation computation such as was described using FIG. 2B. Phase difference pixels constituting a pair are therefore arranged a distance apart to a certain extent.

Since pairs of phase difference pixels are arranged apart, if parts of images, such as a pixel size level high-frequency subject or periodicity-containing subject, such as shown in FIG. 4A and FIG. 4B, become overlaid on phase difference pixels, then cases will arise where it is not possible to calculate correct correlation values, even if correlation calculation is performed using pixel data of phase difference pixels. For example, as shown in FIG. 4A, a case is assumed where for pixel B(i) that outputs a standard signal an image for a high luminance portion of a high frequency subject is projected, while for pixel R(i) that outputs a reference signal an image for a low-luminance part of a high frequency subject is half projected. In this case, since the pixel B(i) and the pixel R(i) are looking at different subjects, it will not be possible to calculate a correct correlation value, even if correlation calculation is performed. Similarly, as shown in FIG. 4B, a low luminance portion of an image is being projected onto pixel B(i) that outputs a standard signal, and a high luminance portion of an image is being projected onto pixel R(i) that outputs a reference signal. In this type of case also, it will not be possible to calculate the correct correlation value even if correlation calculation is performed.

It should be noted that a subject having a high frequency pattern, an inclined pattern, or a periodic pattern means, for example, design and pattern of clothing, and design and pattern of walls, ceilings and floors of buildings etc. when shooting a general subject. Also, when observing/shooting cells using a microscope, for example, an image of a sample such as a collection of many cells could be a high frequency pattern or periodic pattern. Also, when observing/shooting organs etc. within the human body using a medical endoscope, there may be a high-frequency pattern, inclined pattern, or periodic pattern in a case where there are many fine blood vessels, such as blood capillaries.

In cases such as shown in FIG. 4A and FIG. 4B, if the correlation calculation of equation (1) is performed using virtual image pixel data, a correlation calculation value (degree of coincidence) would become an extremely high value far from 0. Accordingly, in a case where incident light of the image pixels is affected by a high frequency subject etc., in other words in a case where a correlation calculation value that has been calculated using virtual image pixel data exceeds a fixed threshold value, it can be said that incident light of the phase difference pixels will also be affected by a high frequency subject etc. Therefore, for ranging areas in which a correlation calculation value, that has been calculated using virtual image pixel data that was calculated for positions of phase difference pixels, has exceeded a specified threshold value, it is possible to obtain a defocus amount using high reliability data, by excluding ranging data of these regions.

In this way, with this embodiment, in the case of a general subject, which is not a subject for which AF detection is difficult, such as a subject having a subject pattern that is a high frequency pattern or a subject having a subject pattern that is a periodic pattern, if correlation calculation is performed using pixel data of L pixels and R pixels, image shift amount changes in accordance with focus adjustment state of the focus lens. On the other hand, since pixel data of image pixels (for example green pixels in FIG. 2B) does not have characteristic change in image shift amount like the L pixels and R pixels (refer to FIG. 3), image shift amount does not change in accordance with defocus of the focus lens. This means that if correlation calculation (degree of coincidence computation) is performed for associated image pixel data, a correlation calculation value will become a value having an extremely high degree of coincidence and close to 0, regardless of defocus amount.

Conditions under which degree of coincidence of image pixel data becomes low are cases where data changes at a pixel size level, and when image data of a high frequency subject before and after a Nyquist frequency etc. exists in subject pixel region. Understandably, in a case where pixel data of normal image pixels is affected and a correlation calculation value changes, pixel data of phase difference pixels is also affected. Accordingly, in a case where a correlation calculation value (degree of coincidence computation value) of virtual image pixel data (G pixel data) moves away from 0 which represents coincidence, and is larger than a specified threshold value due to the effect of an undesirable subject, it is possible to calculate defocus amount using phase difference data of high reliability by excluding phase difference data of that ranging area. In this way, the degree of coincidence computation value represents a high degree of coincidence as the numerical value becomes small, and a low degree of coincidence as the numerical value becomes large.

It should be noted that image pixel data that is the subject of correlation calculation (degree of coincidence computation) is made virtual image pixel data (pixel data of G pixels) after having been corrected using interpolation processing etc. (refer to S5 and S7 in FIG. 5, which will be described later). Since they are at the same positions and intervals, it is possible to determine reliability of detections results for defocus amount using phase difference pixels, by calculating degree of coincidence for associated virtual image pixel (G pixel) data.

Next, a ranging operation of this embodiment will be described using the flowcharts shown in FIG. 5 and FIG. 6. These flowcharts are implemented by the CPU 30a controlling each section within the imaging device 1 based on control programs 14a stored within the flash ROM 14.

If the ranging operation shown in FIG. 5 is commenced, first still readout data is acquired (S1). Here, an accumulation operation for still readout is executed by the image sensor 4, and then the image sensor IF circuit 6 reads out still readout pixel data from the image sensor 4 and stores in memory (DRAM). Still readout pixel data is pixel data that has been read out from the phase difference pixels and image pixels of the image sensor.

Once readout of still readout data (pixel data) has been performed, next, AF calculation is performed using still readout data (S3). Here, the image processing circuit 30b extracts phase difference pixel data from still readout data that was read out and stored in step S1. If the phase difference pixel data has been extracted, the phase difference detection circuit 30c performs correlation calculation such as shown in equation (1), for example, calculates pixel offset amount (scanning position) where correlation calculation value becomes a minimum value, and obtains defocus amount. In this case, correlation calculation is performed for every ranging area, and defocus amount is calculated.

Also, if still readout data has been acquired in step S1, then after image processing on phase difference pixel data, Bayer data (image data corresponding to a Bayer array) is generated (S5). Here, for phase difference pixel data at positions of the R pixels and L pixels shown in FIG. 2A, the image processing circuit 30b performs interpolation computation using surrounding image pixel data, and calculates image pixel data at positions of the G pixels shown in FIG. 2B to generate Bayer data. Specifically, the image processing circuit 30b calculates pixel data for virtual image pixels at positions of the phase difference pixels (R pixels, L pixels).

If Bayer data has been generated, next, degree of coincidence computation is performed using the Bayer data (S7). Here, the phase difference detection circuit 30c calculates degree of coincidence by performing correlation calculation such as shown in equation (1), for example. Calculation of degree of coincidence may be with equation (1) and may be with other than equation (1). It should be noted that processing in steps S5 and S7 may also be performed in parallel with step S3. Also, processing of steps S5 and S7 may be performed after execution of the processing of step S3, or before execution of the processing of step S3.

Once the computation of steps S3 or S7 has been performed, next, reliability determination is performed (S9). Here, reliability is determined for every ranging area based on results of computing degree of coincidence in step S7. In this case, if degree of coincidence computation value is greater than a specified value it is determined that reliability of that ranging area is low, and ranging result of a ranging area having low reliability is excluded. Detailed processing of this reliability determination will be described later using FIG. 6.

If reliability determination has been performed, next, a ranging area is determined (S11). Here, the CPU 30a determines a ranging area used in focus adjustment based on reliability determination results of step S9. Once ranging area has been determined, this flow is terminated, and focus adjustment of the focus lens is performed using a known method.

Next, the reliability determination of step S9 will be described using the flowchart shown in FIG. 6. If the reliability determination flow commences operation, first, AF computation results using still read-out data are referenced (S21). Here AF computation results that were calculated using phase difference pixel data included in the still read-out data in step S3 are referenced.

Next, it is determined whether or not there are a plurality of valid data that can be used in AF computation results (S23). In step S3, when the phase difference detection circuit 30c performs AF computation for every ranging area, there are cases where ranging result is not obtained due to the fact that contrast of the subject is low or there is a periodicity-containing subject. In this step the CPU 30a determines whether or not there are a plurality of ranging areas for which ranging result was obtained using AF computation.

If the result of determination in step S23 is that there are a plurality of valid data that can be used in AF computation results, a degree of coincidence computation value derived from Bayer data is referenced (S25). Here, the CPU 30a references a computation result (degree of coincidence computation value) for degree of coincidence computation for Bayer data that was performed by the phase difference detection circuit 30c in step S7.

If the degree of coincidence computation result for Bayer data has been referenced, next, loop processing from steps S27 to S35 is performed for every ranging area. First, it is determined whether or not degree of coincidence computation value>threshold value (S29). Here, the CPU 30a determines whether or not a degree of coincidence computation value that was calculated in step S7 is larger than a threshold value, for every ranging area.

If the result of determination in step S29 is that the degree of coincidence computation value is larger than the threshold value, it is determined that reliability of AF computation result is low, and that number of AF computation results for which reliability is low is counted as exclusions (S31). As was described previously, degree of coincidence of image pixel data (pixel data after interpolation by interpolation computation) represents reliability of correlation calculation result for the purpose of phase difference AF. If the degree of coincidence computation value is larger than the threshold value, it is judged that reliability of the correlation calculation value for that ranging area is low, and counted as an exemption when determining AF ranging area.

On the other hand, if the result of determination in step S29 is that the degree of coincidence computation value is lower than the threshold value, counting is not performed (S33). Here, differing from step S31, it is determined that reliability of the correlation calculation value of that ranging area is high, and it is not made a count target.

If the processing of step S31 or S33 has been executed, it is next determined whether or not the loop has been completed (S35). Here determination is based on whether the processing of steps S29 to S33 has been performed for ranging areas. If processing has not been performed for all ranging areas, processing is performed for the next ranging area in accordance with the specified sequence.

If the result of determination in step S35 is that the loop has been completed, it is next determined whether or not a number of ranging results>exclusion count number (S37). Here it is determined whether or not a number of ranging areas (number of ranging results) is larger than a number that was counted in step S33.

If the result of determination in step S37 is that the number of ranging areas (number of ranging results) is larger than a number that was counted in step S33, data that was counted as exclusions is excluded from data of the ranging results (S39). Here, since a correlation calculation value for a ranging area in which degree of coincidence computation value that was calculated in step S7 is larger than a threshold value has low reliability, it is determined that the ranging result values (correlation calculation value, defocus amount) for that ranging area will be excluded when calculating (determining) defocus amount of the focus lens.

On the other hand, in a case where the result of determination in step S37 is that the number of ranging areas (number of ranging results) is larger than a number that was counted in step S33 (that is, in a case where the number of ranging areas and the count value match), or if the result of determination in step S23 is that data that can be utilized in AF computation results is 1 or 0, nothing is done (S41). Here, processing such as to exclude data from the ranging results, such as was performed in step S39, is not performed. If the processing of steps S39 or S41 has been performed, the originating processing flow is returned to.

In this way, with this embodiment, phase difference pixel data is included in still read-out data, the degree of similarity S(i) shown in equation (1) is calculated using a standard signal within this phase difference pixel data and a reference signal, and the value where this S(i) becomes a minimum value is obtained (S3). There is a possibility of using this value as a ranging result in in-focus determination.

On the other hand, light shielding members (mask members) for restricting to only light flux that has passed through pupil regions are provided on image pixels (for example, green pixels). As a result, there is no change in relative exposure amount, such as is seen with L pixels and R pixels, even if position of the photographing lens (optical system lens) 2 changes. Accordingly, conditions under which relative exposure amount at image pixels changes are not dependent on defocus amount of the photographing lens 2, but are affected by only image, such as of a pixel size level high-frequency subject, periodicity-containing subject etc.

In a case where relative exposure amount has an effect on image pixels, it will also have an effect on phase difference pixels. Therefore, when calculating degree of similarity S(i), which is equivalent to degree of coincidence, using image pixel data, calculation of defocus amount using high reliability data is possible, by excluding ranging data for which this degree of similarity S(i) is larger than a threshold value. If degree of coincidence (S(i) that has been calculated using equation (1) described above) that has been calculated using Bayer data exceeds a specified threshold value, it can then be determined to be no good as data for ranging calculation (refer to S9) since an image (for example, a high-frequency subject or periodicity-containing subject) that causes ranging error is contained in the standard signal and the reference signal from the beginning. By removing this ranging result of a ranging area that will be excluded it is possible to calculate defocus amount with only high reliability data.

Figure 6:
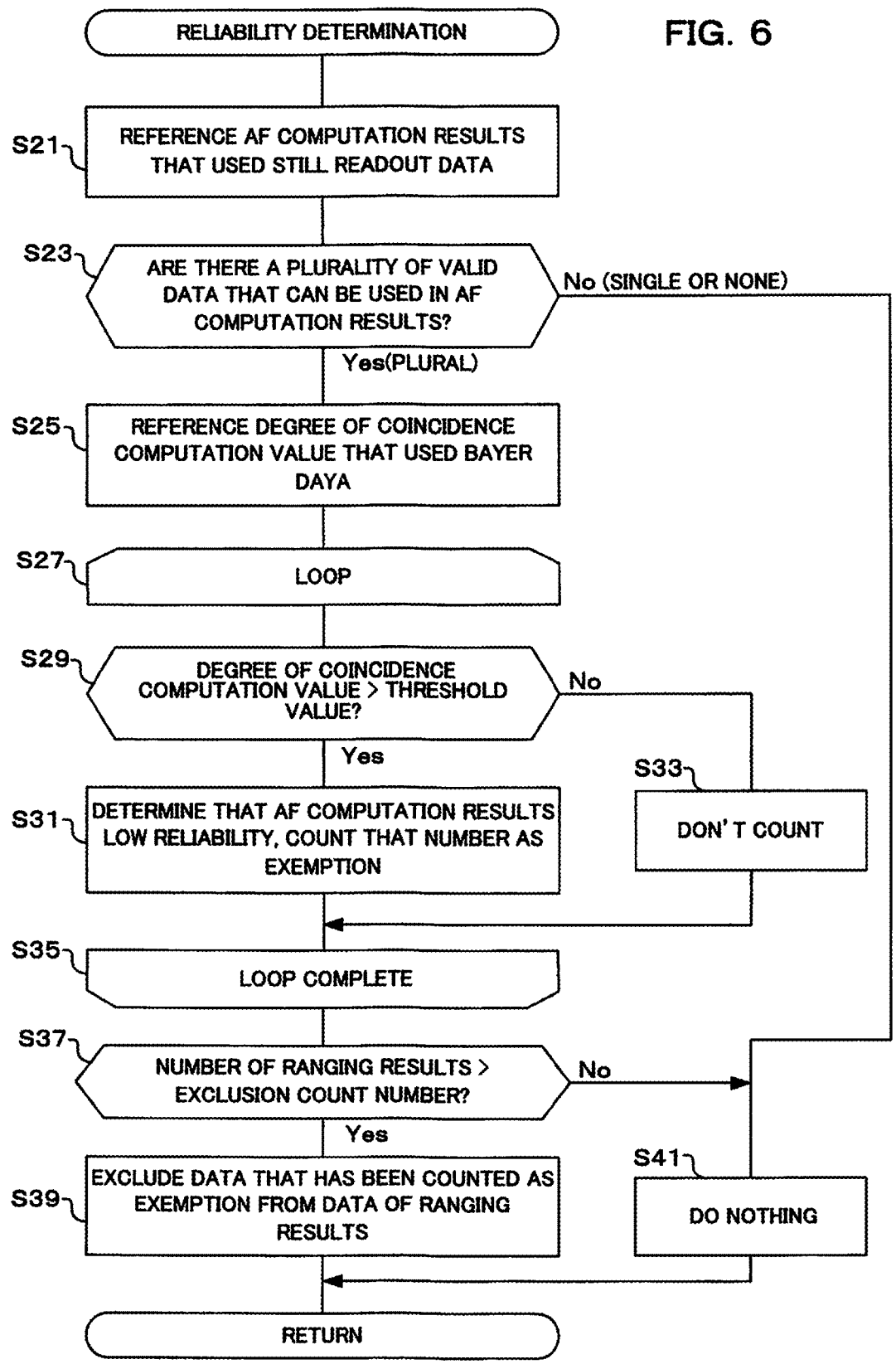
FIG. 6 is a flowchart showing reliability determination operation, in the imaging device of one embodiment of the present invention.

In this way, in the flowcharts shown in FIG. 5 and FIG. 6, phase difference is detected based on pixel data of paired phase difference pixels (S3), pixel data of virtual image pixels is calculated at positions of the phase difference pixels (S5), degree of coincidence of associated pixel data of virtual image pixels that was calculated at positions of the paired phase difference pixels is calculated (S7), reliability of the phase difference detection result is determined in accordance with degree of coincidence (S9), and focus adjustment is performed based on phase difference detection results and the reliability (S11).

As has been described above, with the one embodiment of the present invention, phase difference pixels that detect phase difference using openings that are paired left and right, upper and lower, or in some other way, are arranged on an image sensor (refer to FIG. 2A). Then, virtual image pixel output of positions where phase difference pixels exist is calculated using interpolation computation and degree of coincidence of associated virtual image pixels of paired openings is calculated (refer to S5 and S7 in FIG. 5), and reliability of detection results of defocus amount for image plane phase difference AF is determined using this degree of coincidence (refer to S9 in FIG. 5 and S29 in FIG. 6). Degree of coincidence is calculated using a correlation operation for virtual imaging pixel output, and degree of coincidence is determined to be high as the result of that calculation approaches zero (refer to S7 in FIG. 5 and S29 in FIG. 6). Virtual image pixel data is obtained by interpolation computation etc. using image pixel data around phase difference pixels positions. This means that with this embodiment it is possible to suppress variations in ranging that arise because of separation of arrangement positions of phase difference pixels. It is also possible to exclude erroneous ranging data by utilizing virtual image pixel data of phase difference pixels, and it is possible to perform high precision focus detection.

In a case where light shielded type phase difference pixels are arranged on the image plane of the image sensor, in order to ensure image quality of a taken image, pixel data for positions of phase difference pixels is interpolated using surrounding image pixel data, to give a taken image. In order to avoid problems with this interpolation computation, positions of pairs of phase difference pixels are set apart. Because paired difference pixel positions are different, in a case of a high frequency subject pattern close to the pixel pitch, ranging errors will arise because image forming light that is irradiated on pairs of phase difference pixels is different and the pixel data of the pairs of phase difference pixels is different, and AF precision is lowered. However, as was described above, with this embodiment reliability of ranging results using phase difference AF is determined based on degree of coincidence of output of pairs of virtual image pixels and ranging results of low reliability are removed, which means that it becomes possible to perform high precision focus detection.

It should be noted that with the one embodiment of the present invention virtual image pixel data for positions of phase difference pixels was calculated in steps S5 and S7, and reliability of ranging data using image plane phase difference AF was determined by calculating degree of coincidence of paired virtual image pixel data. However, calculation of degree of coincidence using paired virtual image pixel data may be calculation that includes degree of coincidence of other image pixel data, and reliability of ranging data may be determined using image plane phase difference AF.

Also, image pixel data having the same color filter positioned around phase difference pixels may be selected, and reliability determined by calculating degree of coincidence of associated image pixel data that has been selected. For example, degree of coincidence may also be calculated for image pixel data of red pixels 4R_RE1, 4R_RE2 . . . adjacent to the R pixels in FIG. 7 and image pixel data of red pixels 4L_RE1, 4L_RE2 . . . adjacent to the L pixels. A degree of coincidence calculation method and a reliability determination method may be the same as the methods that used virtual image pixel data. Also, degree of coincidence may be calculated for image pixel data of blue pixels 4R_B1 (4RB2 . . . ) adjacent to R pixels in FIG. 7 and image pixel data of blue pixels 4L_B1 (4LB2 . . . ) adjacent to L pixels. In a case where a plurality of blue (red) pixels exist adjacent to R pixels and L pixels, degree of coincidence may also be calculated by selecting blue (red) pixels having the same positional relationship as the R pixels and L pixels, and degree of coincidence may also be obtained using values (average values) resulting from having added image pixel data of the plurality of adjacent blue (red) pixels.

Figure 7:
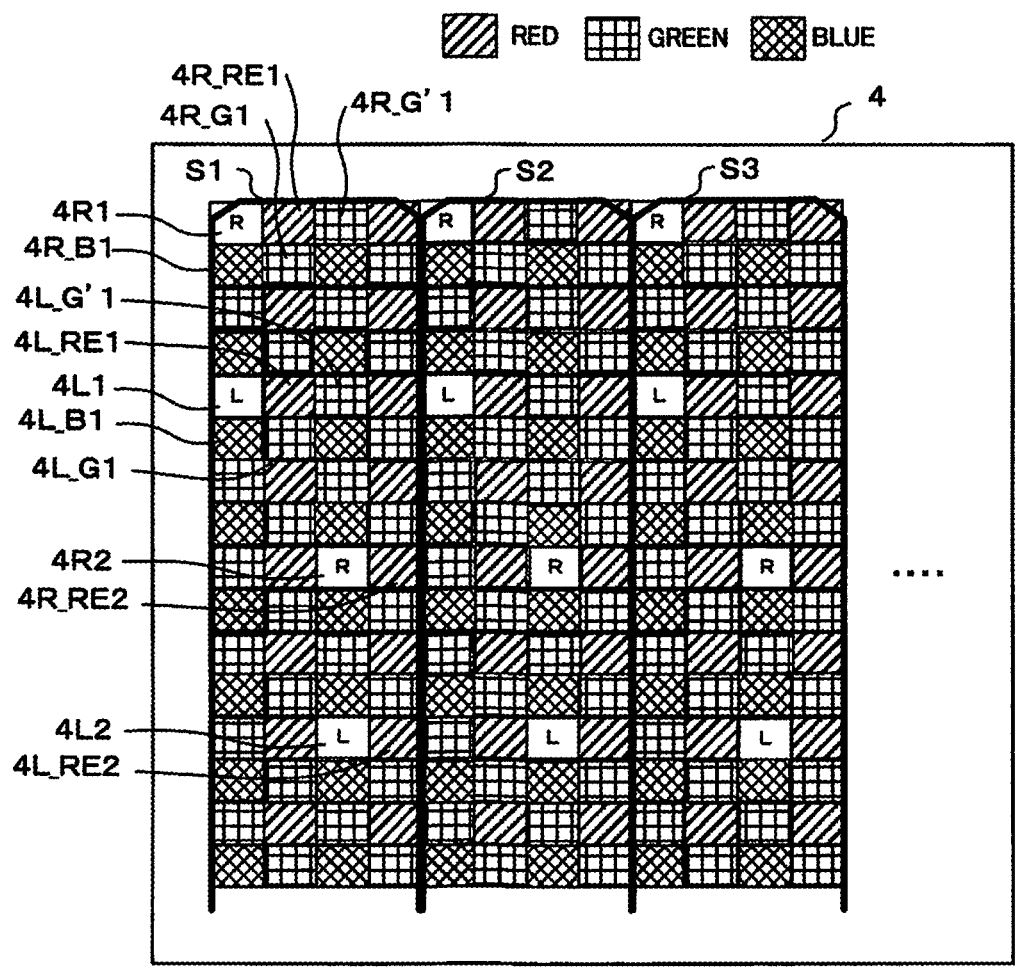
FIG. 7 is a plan diagram showing a modified example of arrangement of pixels of an image sensor of an imaging device of one embodiment of the present invention.

Also, degree of coincidence of image pixel data of green pixels 4R_G1 that are positioned in the vicinity of the R pixels of FIG. 7 and green pixels 4L_G1 that are positioned in the vicinity of the L pixels may be calculated, and degree of coincidence of image pixel data of green pixels 4R_G1' and 4L_G'1 that are between respective arrangement positions of the R pixels and L pixels may also be calculated. Further, reliability may be determined by obtaining a final degree of coincidence (degree of coincidence computation value) by subjecting all or some of a plurality of degrees of coincidence (degree of coincidence computation values), namely degree of coincidence of red pixels 4R_RE1 and 4L_RE1, degree of coincidence of blue pixels 4R_B1 and 4L_B1, and degree of coincidence of green pixels 4R_G1, and 4L_G1 to averaging processing or weighted averaging.

Also, with the one embodiment of the present invention, it was determined that reliability is low if degree of coincidence computation value is higher than a threshold value (refer to S29 and S31 in FIG. 6). However, this is not limiting, and a computation equation for degree of coincidence calculation may also be used such that reliability is determined to be high if degree of coincidence computation value is higher than a threshold value.

Also, with the one embodiment of the present invention, there are circuits such as the image processing circuit 30b and the phase difference detection circuit 30c within the system controller 30, but instead of hardware circuits they may also be configured as software using a CPU and programs, may be implemented by hardware circuits such as gate circuits that are generated based on a programming language described using Verilog, or may be configured using a DSP (Digital Signal Processor). This also applies to each circuit section of a processor consisting of an integrated circuit such as an FPGA (Field Programmable Gate Array). Alternatively, a plurality of processors having one or more CPUs may also be arranged in a distributed manner.

Also, with the one embodiment of the present invention, the clock circuit 8, monitor drive circuit 24 etc. have been constructed separately from the system controller 30, but some or all of these sections may be constructed using software, and executed by the system controller 30. These circuits may also be arranged within the system controller 30.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. The present invention may be applied to an endoscope, as a medical camera. In the case of observing taking enlarged pictures with high magnification factor, such as a microscope for operations, it is probable that there will be images of blood capillaries having a high frequency pattern or inclined pattern. By applying this application, it is possible to perform high precision focus detection and AF even for a subject that contains blood capillaries. In any event, it is possible to adopt the present invention as long as a device carries out focus detection using image plane phase difference AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image sensor having imaging pixels that receive light of a subject image though a photographing lens and perform photoelectric conversion, and paired phase difference pixels that respectively receive light flux corresponding to pupil regions that are paired with the photographing lens and perform photoelectric conversion on the light flux that has been received; and
a processor having a phase difference detection section, pixel data calculation section, degree of coincidence calculation section, reliability determination section, and focus adjustment section, wherein
the phase difference detection section detects a phase difference based on pixel data of the paired phase difference pixels;
the pixel data calculation section calculates pixel data of virtual image pixels at positions of the phase difference pixels, or selects pixel data of image pixels around positions of the phase difference pixels;
the degree of coincidence calculation section calculates degree of coincidence between each pixel data of the virtual image pixels that have been calculated, or calculates degree of coincidence of each pixel data of image pixels that have been selected for positions of paired phase difference pixels;
the reliability determination section determines reliability of the phase difference detection result in accordance with the degree of coincidence; and
the focus adjustment section performs focus adjustment based on the phase difference detection result and the reliability,
wherein the pixel data calculation section includes
a gain setting section that sets gain for pixel data of the phase difference pixels, and
an interpolation section that interpolates pixel data of virtual imaging pixels corresponding to position of the phase difference pixels, based on pixel data of imaging pixels positioned around the phase difference pixels, and
wherein, the pixel data calculation section calculates pixel data of virtual imaging pixels corresponding to positions of the phase difference pixels based on a value resulting from having applied the gain to pixel data of the phase difference pixels, and the pixel data that has been interpolated.

2. The imaging device of claim 1, wherein:
the reliability determination section determines that reliability is low if the degree of coincidence is lower than a threshold value, and
the phase difference detection section detects phase difference by excluding pixel data of the phase difference pixels for which it has been determined that the reliability is low.

3. The imaging device of claim 1, wherein:
the phase difference detection section detects phase difference for every ranging area;
the degree of coincidence calculation section calculates degree of coincidence for every ranging area;
the reliability determination section determines reliability for every ranging area; and
the focus adjustment section determines a ranging area for calculating defocus amount of the photographing lens by excluding ranging results for ranging areas of low reliability based on the reliability that has been determined for each ranging area.

4. The imaging device of claim 1, wherein:
the image sensor has a color filter for every pixel, and
the degree of coincidence calculation section calculates degree of coincidence based on pixel data of image pixels that have the same color filter.

5. The imaging device of claim 4, wherein:
the degree of coincidence calculation section calculates respective degrees of coincidence of associated pixel data of image pixels that have different color filters, and
the reliability determination section determines reliability based on a plurality of degrees of coincidence corresponding to the different color filters.

6. The imaging device of claim 4, wherein:
the degree of coincidence calculation section calculates respective degrees of coincidence of associated pixel data of a plurality of image pixels that have the same color filter, and
the reliability determination section determines reliability based on a plurality of degrees of coincidence for each of the plurality of color filters of the same color.

7. A focus adjustment method, for an imaging device provided with an image sensor having imaging pixels that receive light of a subject image though a photographing lens and perform photoelectric conversion, and paired phase difference pixels that respectively receive light flux corresponding to pupil regions that are paired with the photographing lens and perform photoelectric conversion on the light flux that has been received, comprising:
detecting a phase difference based on pixel data of the paired phase difference pixels;
calculating pixel data of virtual image pixels at positions of the phase difference pixels, or selecting pixel data of image pixels around positions of the phase difference pixels;
calculating degree of coincidence between each pixel data of the virtual image pixels that have been calculated, or calculating degree of coincidence of each pixel data of image pixels that have been selected for positions of paired phase difference pixels;
determining reliability of the phase difference detection result in accordance with the degree of coincidence;
performing focus adjustment based on the phase difference detection result and the reliability; and
at the time of the pixel data calculation,
setting gain for pixel data of the phase difference pixels;
interpolating pixel data of virtual imaging pixels corresponding to position of the phase difference pixels, based on pixel data of imaging pixels positioned around the phase difference pixels; and
calculating pixel data of virtual imaging pixels corresponding to positions of the phase difference pixels based on a value resulting from having applied the gain to pixel data of the phase difference pixels, and the pixel data that has been interpolated.

8. The focus adjustment method of claim 7, further comprising:
determining that reliability is low if the degree of coincidence is lower than a threshold value, and
detecting phase difference by excluding pixel data of the phase difference pixels for which it has been determined that the reliability is low.

9. The focus adjustment method of claim 7, further comprising:
detecting phase difference for every ranging area;
calculating degree of coincidence for every ranging area;
determining reliability for every ranging area; and
determining a ranging area for calculating defocus amount of the photographing lens by excluding ranging results for ranging areas of low reliability based on the reliability that has been determined for each ranging area.

10. The focus adjustment method of claim 7, wherein:
the image sensor has a color filter for every pixel, and further comprising,
calculating degree of coincidence based on pixel data of image pixels that have the same color filter.

11. The focus adjustment method of claim 10, further comprising:
calculating respective degrees of coincidence of associated pixel data of image pixels that have different color filters; and
determining reliability based on a plurality of degrees of coincidence corresponding to the different color filters.

12. The focus adjustment method of claim 10, further comprising:
calculating respective degrees of coincidence of associated pixel data of image pixels that have a plurality of the same color filters; and
determining reliability based on a plurality of degrees of coincidence for each of the plurality of color filters of the same color.

13. A non-transitory computer-readable medium, storing a processor executable code, which when executed by at least one processor, the processor being provided within an imaging device provided with an image sensor having imaging pixels that receive light of a subject image though a photographing lens and perform photoelectric conversion, and paired phase difference pixels that respectively receive light flux corresponding to pupil regions that are paired with the photographing lens and perform photoelectric conversion on the light flux that has been received, performs a focus adjusting method, the focus adjusting method comprising:
detecting a phase difference based on pixel data of the paired phase difference pixels;
calculating pixel data of virtual image pixels at positions of the phase difference pixels, or selecting pixel data of image pixels around positions of the phase difference pixels;
calculating degree of coincidence between each pixel data of the virtual image pixels that have been calculated, or calculating degree of coincidence of each pixel data of image pixels that have been selected for positions of paired phase difference pixels;
determining reliability of the phase difference detection result in accordance with the degree of coincidence;
performing focus adjustment based on the phase difference detection result and the reliability; and
at the time of the pixel data calculation,
setting gain for pixel data of the phase difference pixels;
interpolating pixel data of virtual imaging pixels corresponding to position of the phase difference pixels, based on pixel data of imaging pixels positioned around the phase difference pixels; and
calculating pixel data of virtual imaging pixels corresponding to positions of the phase difference pixels based on a value resulting from having applied the gain to pixel data of the phase difference pixels, and the pixel data that has been interpolated.

14. The non-transitory computer-readable medium of claim 13, storing further processor executable code, which when executed by the at least one processor, causes the at least one processor to perform a method further comprising:
determining that reliability is low if the degree of coincidence is lower than a threshold value; and
detecting phase difference by excluding pixel data of the phase difference pixels for which it has been determined that the reliability is low.

15. The non-transitory computer-readable medium of claim 13, storing further processor executable code, which when executed by the at least one processor, causes the at least one processor to perform a method further comprising:
detecting phase difference for every ranging area;
calculating degree of coincidence for every ranging area;
determining reliability for every ranging area; and
determining a ranging area for calculating defocus amount of the photographing lens by excluding ranging results for ranging areas of low reliability based on the reliability that has been determined for each ranging area.

16. The non-transitory computer-readable medium of claim 13, storing further processor executable code, which when executed by the at least one processor, causes the at least one processor to perform a method further comprising:
the image sensor has a color filter for every pixel, and further comprising,
calculating respective degrees of coincidence based on pixel data of image pixels that have the same color filter.

17. The non-transitory computer-readable medium of claim 16, storing further processor executable code, which when executed by the at least one processor, causes the at least one processor to perform a method further comprising:
calculating respective degrees of coincidence of associated pixel data of image pixels that have different color filters; and
determining reliability based on a plurality of degrees of coincidence corresponding to the different color filters.

18. The non-transitory computer-readable medium of claim 16, storing further processor executable code, which when executed by the at least one processor, causes the at least one processor to perform a method further comprising:
calculating respective degrees of coincidence of associated pixel data of image pixels that have a plurality of the same color filters; and
determining reliability based on a plurality of degrees of coincidence for each of the plurality of color filters of the same color.

* * * * *